United States Patent [19]
Forslund

[11] Patent Number: 5,901,613
[45] Date of Patent: May 11, 1999

[54] INDUSTRIAL ROBOT

[75] Inventor: Karl-Erik Forslund, Västerås, Sweden

[73] Assignee: Asea Brown Boveri AB, Västerås, Sweden

[21] Appl. No.: 08/913,421

[22] PCT Filed: Mar. 28, 1996

[86] PCT No.: PCT/SE96/00404

§ 371 Date: Sep. 15, 1997

§ 102(e) Date: Sep. 15, 1997

[87] PCT Pub. No.: WO96/30168

PCT Pub. Date: Oct. 3, 1996

[30] Foreign Application Priority Data

Mar. 30, 1995 [SE] Sweden ................................. 9501139

[51] Int. Cl.[6] ................................. B25J 17/00; B25J 18/00
[52] U.S. Cl. ................................. 74/490.03; 74/490.05; 414/917; 901/15; 901/23; 901/48
[58] Field of Search ............................ 74/490.03, 490.05; 414/917; 901/15, 23, 48

[56] References Cited

U.S. PATENT DOCUMENTS

| 4,140,226 | 2/1979 | Richter | 414/917 X |
| 4,773,813 | 9/1988 | Nakashima et al. | 901/23 X |
| 5,065,062 | 11/1991 | Uehara et al. | 901/23 X |
| 5,145,312 | 9/1992 | Sonoda et al. | 414/917 X |

*Primary Examiner*—Allan D. Herrmann
*Attorney, Agent, or Firm*—Watson Cole Grindle Watson, P.L.L.C.

[57] ABSTRACT

An industrial robot comprises a stand mounted on a foot and being rotatable about a first, vertical axis, said stand supporting a first robot arm which is rotatable in relation to the stand about a second, horizontal axis. The stand comprises an underbody with two projecting parts which support an intermediate part which is rotatable in relation to the stand. The intermediate part comprises two parallel supporting elements, at the upper ends of which the first robot arm is journalled. The lower ends of the supporting elements are rotatably attachable to the underbody. The robot may thus be tilted forwards or backwards and be fixed in these positions during the robot operation, so as to obtain different types of operating ranges.

8 Claims, 2 Drawing Sheets

INDUSTRIAL ROBOT

TECHNICAL FIELD

The present invention relates to an industrial robot comprising a stand arranged on a foot and being rotatable about a first axis, the stand comprising a supporting plate with at least one supporting element which supports a first robot arm which is rotatable about a second axis.

BACKGROUND ART

A manipulator, for example an industrial robot, has a stand which is rotatably arranged on a foot fixed to a base plate and which supports a first robot arm which is rotatable in relation to the stand. At the outer end of this arm, a second robot arm is rotatably journalled. This second arm is rotatable about its own longitudinal axis and supports, at its outer end, a robot hand which is provided with a tool attachment and which is rotatable in two degrees of freedom relative to the second arm. To achieve movement of the mentioned robot arms and the hand, a drive means is arranged at each axis. Each such drive means comprises a motor and a reduction gear with a high gear ratio.

An industrial robot of the above-mentioned kind has an operating range which is limited by the physical extent of the arms of the robot as well as the mobility around the axes. An industrial robot fixed to a base plate therefore has a given operating range within which the workpieces to be machined by the industrial robot must be introduced. However, an industrial robot may be used for a wide variety of tasks, and for this reason demands are sometimes made for a changed accessibility or a changed operating range. By moving the industrial robot to a new attachment point, the operating range may be moved, but in order to change the operating range, it is also required that the structure of the industrial robot be changed. This can be achieved by replacing parts of the robot, for example the stand or some of the robot arms.

From the publication "IRB 6400 Industrial Robot", ABB 6397 032-145, March 1994, an industrial robot is known in which the operating range can be increased by extending the second arm. This is achieved by providing the second arm with an extension module. The operating range can also be changed by so-called shelf mounting, in which case an angular module is joined to the stand. This module gives the robot a changed operating range allowing it to work in front of and under itself. One problem with the described methods of increasing the flexibility of the robot by reconstructing it is that a production loss arises during the mounting time. An additional problem is that the reconstruction entails new cabling, which results in additional costs. A robot configuration changed in this way also entails a reprogramming of the control equipment of the robot.

SUMMARY OF THE INVENTION

The object of the invention is to achieve an industrial robot, the operating range of which may be adapted to different production purposes without any costs for rebuilding or production loss arising. Such an industrial robot is to be capable of being adjusted, simply and in a short time, to different types of operating ranges and different work operations. This is achieved according to the invention by an industrial robot in which the stand comprises adjustable supporting elements for the first arm, allowing the robot to tilt forwards or backwards. The supporting elements are rotatable around a horizontal axis parallel to the axis of the first arm and capable of being fixed to a supporting plate comprised in the stand. The supporting elements are arranged mutually parallel and are fixed to the supporting plate with friction joints in fixed angular steps known to the control equipment. This allows the robot to be rapidly reconfigured to operating ranges of the "under body" type, in which the robot is working from below towards an object above itself. It can also be rapidly adjusted to an operating range of the "shelf-mounted" type, in which the robot is working in front of and under itself as if it were placed on a shelf. The change can be carried out without having to replace the cabling of the robot. By introducing the rotatably attachable supporting elements, the robot can be adjusted in a very short time to a new production purpose.

BRIEF DESCRIPTION OF THE DRAWINGS

The invention will be explained in greater detail by description of an embodiment with reference to the accompanying drawings, wherein.

DESCRIPTION OF THE PREFERRED EMBODIMENTS

Figure 1:
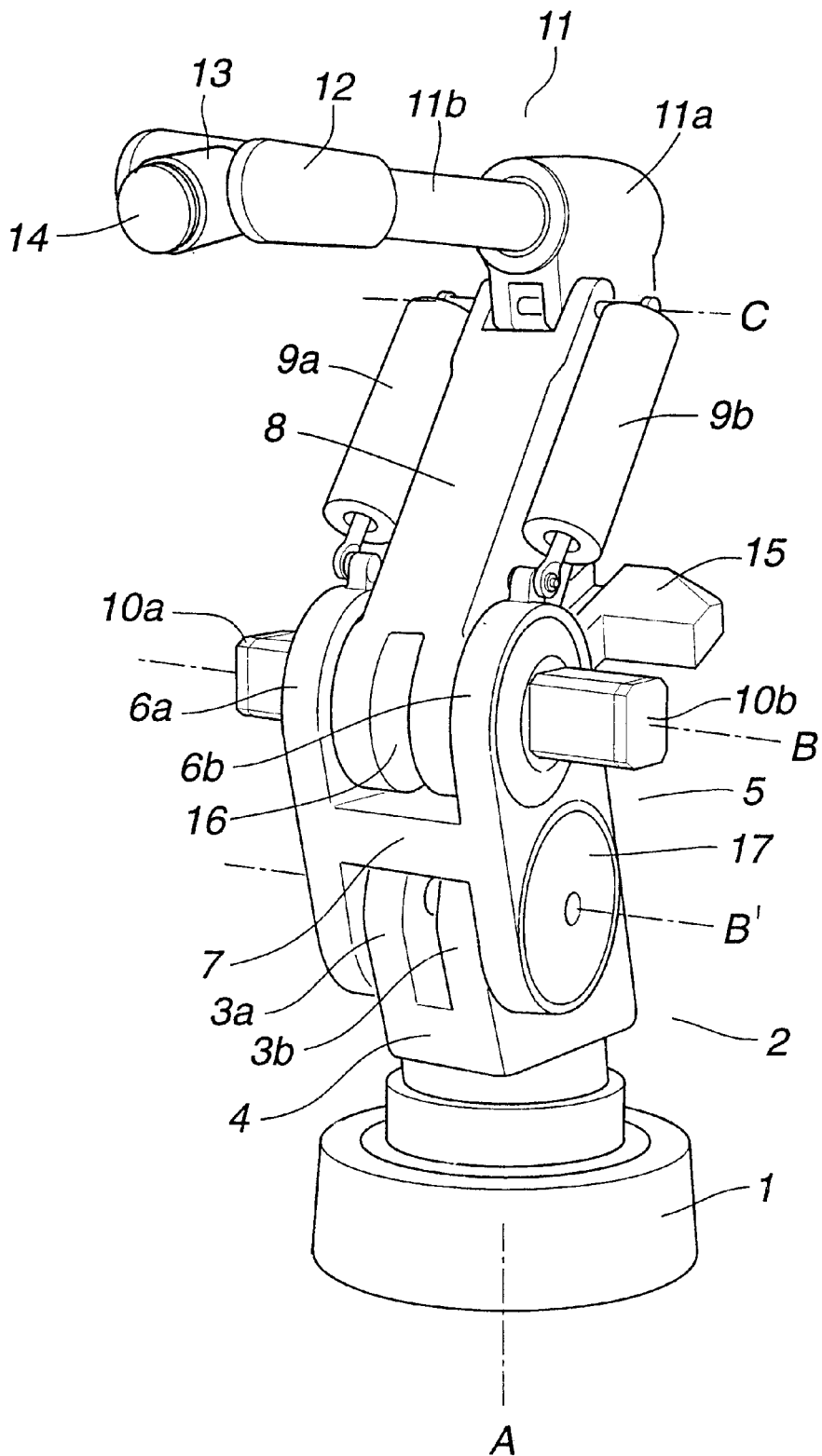
FIG. 1 shows a three-dimensional view of an industrial robot according to the invention.

The industrial robot shown in FIG. 1 has a stand 2 which is rotatably journalled in a cylindrical robot foot 1 which is secured to a mounting base, the stand being capable of pivoting about a vertical axis A. The stand 2 comprises an intermediate part 5, which supports a first robot arm 8. The first robot arm 8 is pivotally journalled in the intermediate part 5 about a horizontal axis B. At the upper end of the first robot arm 8, a second robot arm 11 is pivotally journalled about a horizontal axis C which is parallel to axis B. The second robot arm 11 consists of a rear part 11a, which is capable of pivoting about the axis C, and a tubular front part 11b journalled in the rear part and being rotatable about the longitudinal axis of the arm 11. The outer end portion of the front arm part consists of a wrist 12, which comprises a wrist part 13 rotatable about an axis, normally the longitudinal axis of the second arm, and a tool attachment in the form of a turning disc 14, which is rotatable about the longitudinal axis of the wrist part 13.

The stand 2 has a U-shaped cross section, in which a first vertically projecting part 3a and a second vertically projecting part 3b are fixed to a lower supporting plate 4 which is rotatable around the vertical axis A. To the vertically projecting parts 3a, 3b, the intermediate part 5 is rotatably attachable around a horizontal axis B' parallel to axis B. The intermediate part 5 comprises a first supporting element 6a and a second supporting element 6b which is parallel to the first element, between which a space 16 is created in which the first robot arm 8 can be pivoted. The supporting elements 6a, 6b are attached to the projecting parts 3 of the stand by means of a friction joint 17. The supporting elements 6a, 6b are box-shaped with an upper and a lower semicylindrical portion. To ensure that the supporting elements 6a, 6b always move mutually parallel, they are rigidly connected to a horizontal cross bar 7. The first robot arm 8 is pivotally journalled in the upper ends of the supporting elements 6a, 6b.

The movement of the first robot arm around the horizontal axis B is balanced by a first equalizer spring 9a and a second equalizer spring 9b, which are articulately fixed between the upper end of the first robot arm 8 and the respective supporting elements 6a, 6b. The lower end of the first robot arm 8 is connected to a drive means which is fixed to the first supporting element 6a and which comprises a motor 10a and a reduction gear housed in the first supporting element 6a. The pivoting of the second robot arm 11 is performed over a parallel rod 19, the lower end of which is connected to an extended crank arm rotatable about the axis B. The extended crank arm supports a counterweight 15 for balancing the second robot arm 11, and its crankshaft is connected to a drive means which is attached to the second supporting element 6b and which comprises a motor 10b and a reduction gear housed in the second supporting element 6b.

Figures 2A, 2B, 2C:
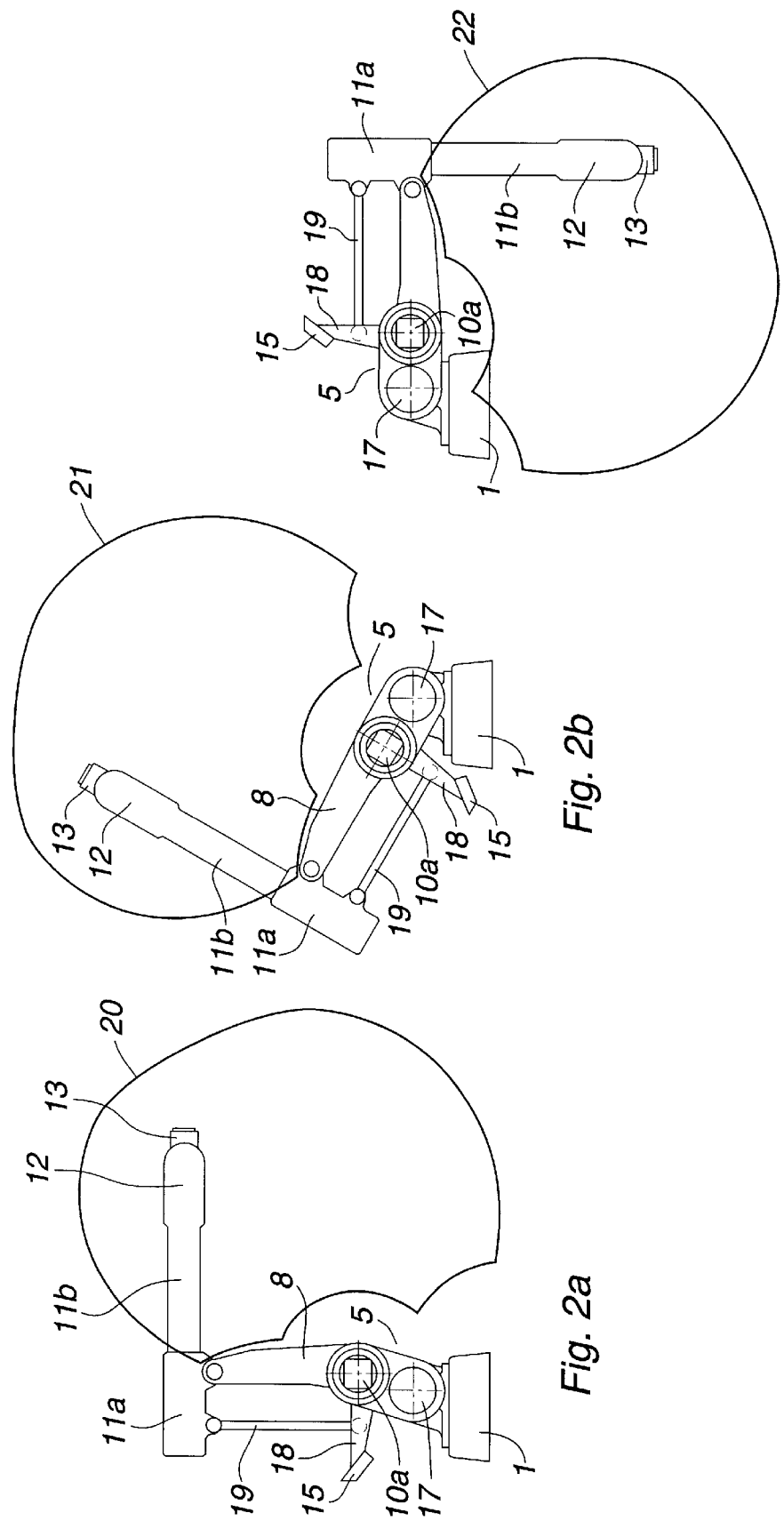
FIGS. 2a, 2b, and 2c show a side view of an industrial robot according to the invention with examples of a few types of working ranges which may be achieved.

FIGS. 2a through 2c show how an industrial robot according to the invention may be configured to different types of operating ranges. FIG. 2a shows a normal operating range 20 whereas FIG. 2b shows how the robot can be given an operating range 21 of the "under body" type, where the robot is working from below, by providing an intermediate part 5 tilting backwards. FIG. 2c shows how the robot can be given an operating range 22 of the "shelf-mounted" type; where the robot is able to work in front of and under itself, by providing an intermediate part 5 tilting forwardly.

The described industrial robot according to the invention is not limited to comprising an industrial robot with a stand having two projecting parts 3a, 3b. The intermediate part 5, which may comprise only one supporting element, can advantageously be fixed to a stand with only one projecting part. Nor is the invention limited to being applied to a robot with a counterweight 15 and a parallel rod 19, but may also be applied to a robot without such means.

The pivoting of the intermediate part 5 is suitably carried out by a drive means connected between the supporting plate and one of the supporting elements 6a, 6b and comprising a motor and a reduction gear. This drive means may be of a simpler kind than the drive means of the robot and may be housed in the supporting element. The operating range is set with the drive means whereupon the supporting element is fixed to the supporting plate by means of the friction joint.

During the working cycle of the robot, the intermediate part 5 is fixed to the supporting plate 4 so as to form a stand 2 with a stable shape. During work, therefore, the robot functions as an ordinary industrial robot with six degrees of freedom. This facilitates the programming of the control equipment. On occasions where a different operating range is desired, the friction joint 17 is detached, allowing the intermediate part to be rotated and adjusted into the desired position, whereupon the intermediate part 5 is again locked with the friction joint 17. The new fixed position may be known to the control equipment in advance or be sensed by means of a calibration process. Such a calibration process may be performed such that the robot in its new position is brought to sense a number of known positions, the coordinates of which are fed into the control system. The locking member for fixing the intermediate part is not limited to being a friction joint but may arbitrarily consist of a member which fixes the intermediate part to the supporting plate so that the loading torque of the robot can be transferred to the supporting plate.

I claim:

1. An industrial robot comprising a foot, a stand rotatably arranged in relation to the foot about a first axis and a first robot arm rotatably arranged in relation to the stand about a second axis, said stand comprising an underbody and at least one supporting element which supports the first robot arm, characterized in that the supporting element is rotatably arranged at the underbody and is capable of being locked for fixing the supporting element to the underbody during the operating cycle of the robot.

2. An industrial robot according to claim 1, characterized in that the first axis is substantially vertical.

3. An industrial robot according to claim 1, characterized in that the supporting element is rotatable about an axis parallel to the second axis.

4. An industrial robot according to claim 1, characterized in the second axis (B) is substantially horizontal.

5. An industrial robot according to claim 1, characterized in that the drive means for the movement of the first arm (8) is arranged in the supporting element (6).

6. An industrial robot according to claim 1, characterized in that the stand comprises a first supporting element and a second supporting element, parallel to said first element, in which the first arm is journalled and between which a space is formed, in which the first arm is capable of pivoting.

7. An industrial robot according to claim 6, characterized in that the first arm supports a second arm which is rotatable in relation to the first arm and which is connected, by a parallel rod, to a crank pivotable about the axis of the first robot arm, and that a drive means for the movement of the second arm is arranged in the second supporting element.

8. An industrial robot according to claim 1, characterized in that between the underbody and the supporting element a drive means is connected for rotating the supporting element between the fixed positions.

* * * * *